(12) United States Patent
Deshpande et al.

(10) Patent No.: US 11,978,236 B2
(45) Date of Patent: May 7, 2024

(54) EFFICIENT RETRIEVAL OF A TARGET FROM AN IMAGE IN A COLLECTION OF REMOTELY SENSED DATA

(71) Applicant: Tata Consultancy Services Limited, Mumbai (IN)

(72) Inventors: Shailesh Shankar Deshpande, Pune (IN); Balamuralidhar Purushothaman, Bangalore (IN)

(73) Assignee: Tata Consultancy Limited Services, Mumbai (IN)

( * ) Notice: Subject to any disclaimer, the term of this patent is extended or adjusted under 35 U.S.C. 154(b) by 370 days.

(21) Appl. No.: 17/513,011

(22) Filed: Oct. 28, 2021

(65) Prior Publication Data
US 2022/0319144 A1 Oct. 6, 2022

(30) Foreign Application Priority Data
Feb. 25, 2021 (IN) .............................. 202121007922

(51) Int. Cl.
G06V 10/24 (2022.01)
G06T 7/11 (2017.01)
G06V 10/25 (2022.01)
G06V 10/44 (2022.01)
G06V 10/774 (2022.01)

(52) U.S. Cl.
CPC .............. *G06V 10/245* (2022.01); *G06T 7/11* (2017.01); *G06V 10/25* (2022.01); *G06V 10/44* (2022.01); *G06V 10/7747* (2022.01); *G06T 2207/10032* (2013.01); *G06T 2207/20168* (2013.01)

(58) Field of Classification Search
CPC ...... G06V 10/245; G06V 10/25; G06V 10/44; G06V 10/7747; G06V 10/46; G06V 20/70; G06V 20/13; G06T 7/11; G06T 2207/10032; G06T 2207/20168; G06F 18/214; G06F 18/256
See application file for complete search history.

(56) References Cited

U.S. PATENT DOCUMENTS
9,076,039 B2 * 7/2015 Halper .................. G06V 20/13

OTHER PUBLICATIONS
Lv, Wenjing, and Xiaofei Wang. "Overview of hyperspectral image classification." Journal of Sensors 2020 (2020). (Year: 2020).*
(Continued)

*Primary Examiner* — Emily C Terrell
*Assistant Examiner* — Stefano Anthony Dardano
(74) *Attorney, Agent, or Firm* — Finnegan, Henderson, Farabow, Garrett & Dunner, L.L.P.

(57) ABSTRACT

State of art techniques performing image labeling of remotely sensed data are computation intensive, consume time and resources. A method and system for efficient retrieval of a target in an image in a collection of remotely sensed data is disclosed. Image scanning is performed efficiently, wherein only a small percentage of pixels from the entire image are scanned to identify the target. One or more samples are intelligently identified based on sample selection criteria and are scanned for detecting presence of the target based on cumulative evidence score Plurality of sampling approaches comprising active sampling, distributed sampling and hybrid sampling are disclosed that either detect and localize the target or perform image labeling indicating only presence of the target.

18 Claims, 16 Drawing Sheets

(56) References Cited

OTHER PUBLICATIONS

Butko et al., "Optimal Scanning for Faster Object Detection," (2009).
Feng et al., "Salient Object Detection by Composition," (2011).
Hall et al., "Probabilistic Object Detection: Definition and Evaluation," (2020).
Uzkent et al., "Efficient Object Detection in Large Images using Deep Reinforcement Learning," (2020).
Zhang et al., "Efficient Scan-Window Based Object Detection using GPGPU," (2008).

* cited by examiner

Planes (target)

EFFICIENT RETRIEVAL OF A TARGET FROM AN IMAGE IN A COLLECTION OF REMOTELY SENSED DATA

This U.S. patent application claims priority under 35 U.S.C. § 119 to: Indian patent application no. 202121007922, filed on Feb. 25, 2021. The entire contents of the aforementioned application are incorporated herein by reference.

TECHNICAL FIELD

The embodiments herein generally relate to image analysis of remotely sensed data and, more particularly, to a method and system for efficient retrieval of a target from an image in a collection of remotely sensed data.

BACKGROUND

Remotely sensed data refers to the data captured by various satellite platforms in synchronized orbits (at ~800 km) at regular interval on a given path. Multiple path covers entire earth. Such remote sensing satellites have been monitoring earth since ~1970s. Currently, multitude satellite constellations are available providing high-resolution imagery, leading to huge amount of earth observations with wide range of coverage (spectral and spatial), and resolution (spatial, spectral, and temporal).

Application of remotely sensed data of any scale (global, regional, local) begin with choosing suitable image/s. Not all the images acquired by remote sensing platforms may be suitable for a given study. There are two obvious reasons for it: firstly, the image may not have the target, wherein the target refers to an object of interest or a set of desired spectral and spatial properties, and secondly, the target may be present but with insufficient information or noisy information. In the second case, the images might not be suitable for the study for variety of reasons, for example, the cloud cover may hide the information of the interest, haze may affect the quality of the image beyond the repair, noise and faults in the electronic acquisition system may not acquire the image correctly, and so on. The meta-data such as cloud cover may be available. However, if it occludes the object of interest not known beforehand.

Thus, identifying relevant images having the target, from huge volume of remotely sensed data is a critical problem. Traditional approaches tag the images with target text and indexed accordingly for easy search. The tags may have been created manually or automatically. In the manual process, the expert, based on his experience about the atmospheric conditions of the study area and the target, would choose suitable months for the initial search and then browse the images within that period and find most suitable image by manual looking at each of them. If the tags are not available, then the entire image needs to be scanned and every pixel within the image has to be accessed to identify the target or suitable properties. The process may end with tagging the image with text label of the target (for example, if 'lake' is present in the image, then image would be tagged with keyword "lake"). It may also end by just tagging the image with keywords as 'suitable' or 'unsuitable.

However, many challenges and limitations exists with this traditional process. First, the search is not scalable by current automated processes of target detection or content tagging if the images over wide coverage (temporal and spatial) are required. For example, monitoring decadal changes would require searching images over a longer duration. Second, the target or desired properties of the interest may not be conspicuous and easily detectable spatially and spectrally. Scanning entire image to assess the presence or absence of target is time consuming and not scalable for the study requiring wide coverage (spatial, and temporal).

SUMMARY

Embodiments of the present disclosure present technological improvements as solutions to one or more of the above-mentioned technical problems recognized by the inventors in conventional systems.

For example, in one embodiment, a method for efficient retrieval of a target from an image in a collection of remotely sensed data is provided. The method includes receiving the image from a set of images in the collection of remotely sensed data to retrieve the target from the image. The target is defined by spatial features, spectral features, or a combination thereof.

Further, the method includes selecting a first sample set of pixels from the image by applying a sampling technique, wherein the sampling technique comprises one of: a) an active sampling technique that selects the first sample set of pixels based on location criteria, and successive sample sets in vicinity of a sample set identified for a previous iteration, wherein the location criteria comprises one of i) selecting pixels within a predefined radius around a pixel at center of the image, and ii) selecting the pixels within the predefined radius at a region in the image wherein pixels features of the region have highest reciprocal difference with respect to the pixel features associated with the target, and wherein the active sampling technique enables simultaneous detecting and localizing of the plurality of desired properties in the image; and b) an evenly distributed sampling technique that selects i) the first sample set of pixels comprising evenly distributed pixels across the image, and ii) the successive sample sets by varying frequency of the evenly distributed pixels to gradually reduce spatial distance between the evenly distributed pixels, wherein the evenly distributed sampling technique enables detecting of the plurality of desired properties in the image.

Further, the method includes estimating by ML models executed by the one or more hardware processors by processing the first sample set of pixels, wherein the evidence score is indicative of magnitude of presence of the target in the image. Further, the method includes identifying the image to have the target and labelling the image as image of interest if the estimated evidence score computed for the first sample set of pixels, is above an evidence threshold. Further, the method includes selecting successive sample sets in relation to the first sample set of pixels, for the successive sampling iterations, wherein the selection is in accordance with the sampling technique applied. Further, the method includes computing by the ML models executed by the one or more hardware processors, a cumulative evidence score, for a current sample set of pixels and a previous sample set of pixels. Further, the method includes identifying the image to have the target, retaining labelling of the image as the image of interest, and terminating the cumulative evidence score computation if the cumulative evidence score is above the evidence threshold. Further, the method includes continuing the cumulative evidence score computation for the successive sample sets of pixels, if the evidence score computed in current iteration is below or equal to the evidence threshold. Furthermore, the method includes discarding the image if post entire processing of the image, the cumulative evidence score is below the evidence threshold.

Further, the method includes applying a hybrid sampling technique that utilizes combination of even distributed sampling technique and the active sampling technique, wherein the hybrid sampling technique enables simultaneous detecting and localizing of the plurality of desired properties in the image. The hybrid sampling technique comprising: segmenting the image into a first set of plurality of quadrants; applying the even sampling technique to identify a plurality of first samples of pixels around each of a plurality of pixels locations placed at equal pixels intervals in each of the first set of plurality of quadrants; computing the evidence score for each of the plurality of first samples of pixels for each of the first set of plurality of quadrants; selecting a first quadrant among the first set of plurality of quadrants, wherein the selected first quadrant has highest cumulative evidence score calculated by aggregating the evidence scores of each of the plurality of first samples of pixels lying in the first quadrant; segmenting the first quadrant into a second set of plurality of quadrants; and iteratively performing the steps of hybrid sampling technique on the second set of plurality of quadrants till the target is detected and localized.

In another aspect, a system for efficient retrieval of a target from an image in a collection of remotely sensed data is provided. The system comprises a memory storing instructions; one or more Input/Output (I/O) interfaces; and one or more hardware processors coupled to the memory via the one or more I/O interfaces, wherein the one or more hardware processors are configured by the instructions to receive the image from a set of images in the collection of remotely sensed data to retrieve the target from the image. The target is defined by spatial features, spectral features, or a combination thereof.

Further, the system is configured to select a first sample set of pixels from the image by applying a sampling technique, wherein the sampling technique comprises one of: a) an active sampling technique that selects the first sample set of pixels based on location criteria, and successive sample sets in vicinity of a sample set identified for a previous iteration, wherein the location criteria comprises one of i) selecting pixels within a predefined radius around a pixel at center of the image, and ii) selecting the pixels within the predefined radius at a region in the image wherein pixels features of the region have highest reciprocal difference with respect to the pixel features associated with the target, and wherein the active sampling technique enables simultaneous detecting and localizing of the plurality of desired properties in the image; and b) an evenly distributed sampling technique that selects i) the first sample set of pixels comprising evenly distributed pixels across the image, and ii) the successive sample sets by varying frequency of the evenly distributed pixels to gradually reduce spatial distance between the evenly distributed pixels, wherein the evenly distributed sampling technique enables detecting of the plurality of desired properties in the image.

Further, the system is configured to estimate by ML models executed by the one or more hardware processors by processing the first sample set of pixels, wherein the evidence score is indicative of magnitude of presence of the target in the image. Further, the system is configured to identify the image to have the target and labelling the image as image of interest if the estimated evidence score computed for the first sample set of pixels, is above an evidence threshold. Further, the system is configured to select successive sample sets in relation to the first sample set of pixels, for the successive sampling iterations, wherein the selection is in accordance with the sampling technique applied. Further, the system is configured to compute by the ML models executed by the one or more hardware processors, a cumulative evidence score, for a current sample set of pixels and a previous sample set of pixels. Further, the system is configured to identify the image to have the target, retaining labelling of the image as the image of interest, and terminating the cumulative evidence score computation if the cumulative evidence score is above the evidence threshold. Further, the system is configured to continue the cumulative evidence score computation for the successive sample sets of pixels, if the evidence score computed in current iteration is below or equal to the evidence threshold. Furthermore, the system is configured to discard the image if post entire processing of the image, the cumulative evidence score is below the evidence threshold.

Further, the system is configured to apply a hybrid sampling technique that utilizes combination of even distributed sampling technique and the active sampling technique, wherein the hybrid sampling technique enables simultaneous detecting and localizing of the plurality of desired properties in the image. The hybrid sampling technique comprising: segmenting the image into a first set of plurality of quadrants; applying the even sampling technique to identify a plurality of first samples of pixels around each of a plurality of pixels locations placed at equal pixels intervals in each of the first set of plurality of quadrants; computing the evidence score for each of the plurality of first samples of pixels for each of the first set of plurality of quadrants; selecting a first quadrant among the first set of plurality of quadrants, wherein the selected first quadrant has highest cumulative evidence score calculated by aggregating the evidence scores of each of the plurality of first samples of pixels lying in the first quadrant; segmenting the first quadrant into a second set of plurality of quadrants; and iteratively performing the steps of hybrid sampling technique on the second set of plurality of quadrants till the target is detected and localized.

In yet another aspect, there are provided one or more non-transitory machine-readable information storage mediums comprising one or more instructions, which when executed by one or more hardware processors causes a method for efficient retrieval of a target from an image in a collection of remotely sensed data.

The method includes receiving the image from a set of images in the collection of remotely sensed data to retrieve the target from the image. The target is defined by spatial features, spectral features, or a combination thereof.

Further, the method includes selecting a first sample set of pixels from the image by applying a sampling technique, wherein the sampling technique comprises one of: a) an active sampling technique that selects the first sample set of pixels based on location criteria, and successive sample sets in vicinity of a sample set identified for a previous iteration, wherein the location criteria comprises one of i) selecting pixels within a predefined radius around a pixel at center of the image, and ii) selecting the pixels within the predefined radius at a region in the image wherein pixels features of the region have highest reciprocal difference with respect to the pixel features associated with the target, and wherein the active sampling technique enables simultaneous detecting and localizing of the plurality of desired properties in the image; and b) an evenly distributed sampling technique that selects i) the first sample set of pixels comprising evenly distributed pixels across the image, and ii) the successive sample sets by varying frequency of the evenly distributed pixels to gradually reduce spatial distance between the evenly distributed pixels, wherein the evenly distributed sampling technique enables detecting of the plurality of desired properties in the image.

Further, the method includes estimating by ML models executed by the one or more hardware processors by processing the first sample set of pixels, wherein the evidence score is indicative of magnitude of presence of the target in the image. Further, the method includes identifying the image to have the target and labelling the image as image of interest if the estimated evidence score computed for the first sample set of pixels, is above an evidence threshold. Further, the method includes selecting successive sample sets in relation to the first sample set of pixels, for the successive sampling iterations, wherein the selection is in accordance with the sampling technique applied. Further, the method includes computing by the ML models executed by the one or more hardware processors, a cumulative evidence score, for a current sample set of pixels and a previous sample set of pixels. Further, the method includes identifying the image to have the target, retaining labelling of the image as the image of interest, and terminating the cumulative evidence score computation if the cumulative evidence score is above the evidence threshold. Further, the method includes continuing the cumulative evidence score computation for the successive sample sets of pixels, if the evidence score computed in current iteration is below or equal to the evidence threshold. Furthermore, the method includes discarding the image if post entire processing of the image, the cumulative evidence score is below the evidence threshold.

Further, the method includes applying a hybrid sampling technique that utilizes combination of even distributed sampling technique and the active sampling technique, wherein the hybrid sampling technique enables simultaneous detecting and localizing of the plurality of desired properties in the image. The hybrid sampling technique comprising: segmenting the image into a first set of plurality of quadrants; applying the even sampling technique to identify a plurality of first samples of pixels around each of a plurality of pixels locations placed at equal pixels intervals in each of the first set of plurality of quadrants; computing the evidence score for each of the plurality of first samples of pixels for each of the first set of plurality of quadrants; selecting a first quadrant among the first set of plurality of quadrants, wherein the selected first quadrant has highest cumulative evidence score calculated by aggregating the evidence scores of each of the plurality of first samples of pixels lying in the first quadrant; segmenting the first quadrant into a second set of plurality of quadrants; and iteratively performing the steps of hybrid sampling technique on the second set of plurality of quadrants till the target is detected and localized. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
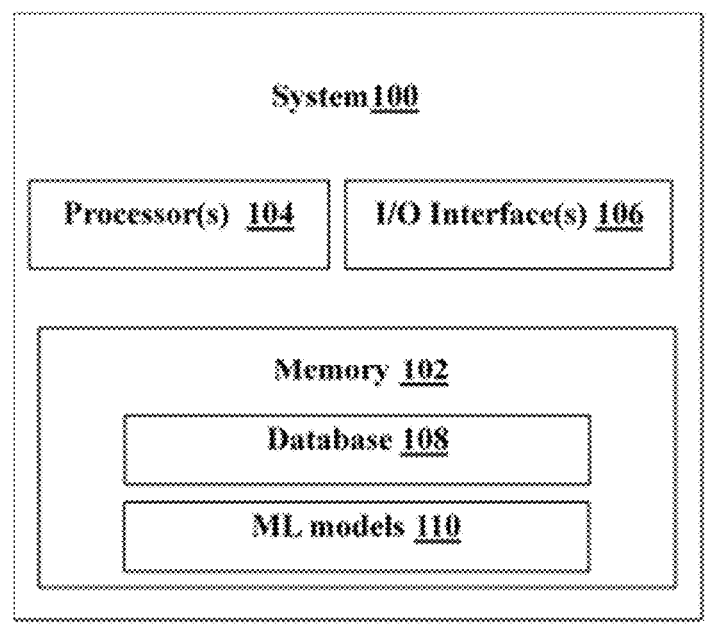
FIG. 1A is a functional block diagram of a system, for efficient retrieval of a target from an image in a collection of remotely sensed data, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure provide a method and system for efficient retrieval of a target from an image in a collection of remotely sensed data. Computation efficient, time efficient and resource efficient scanning approach is used, wherein only a small percentage of pixels from the entire image are scanned to identify a target in the image. The target is defined by spectral properties, spatial properties or a combination thereof, and wherein the target comprises one of an object of interest or a plurality of properties of interest.

The percentage of pixels refer to pixels in the sample sets selected for analysis. One or more sample are intelligently identified based on sample selection criteria and are scanned for detecting presence of the plurality of properties of interest. In one embodiment, the target is detected and simultaneously localized. Further, the image is labelled or tagged as the image of interest if a cumulative evidence score for target presence, computed for the one or more samples, is above a evidence threshold. In an alternative, the method may restrict to only detection and tagging without localization of the target.

The method disclosed provide a plurality of sampling approaches such as an active sampling of samples/pixels that maximizes chances of finding the target or abandons the image analysis and discard the image accordingly. The active approach results in detecting and localizing the target. Other strategy followed refers to evenly distributed sampling of pixels, while the third alternative is hybrid sampling where in the search is evenly distributed locally, while is active globally or vice versa.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 is a functional block diagram of a system 100 for efficient retrieval of the target from the image in the collection of remotely sensed data, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores the collection of remotely sensed images to be analyzed, the labelled images detected with the target and the like. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIG. 2 and examples of FIGS. 3 through 5.

Figure 1B:
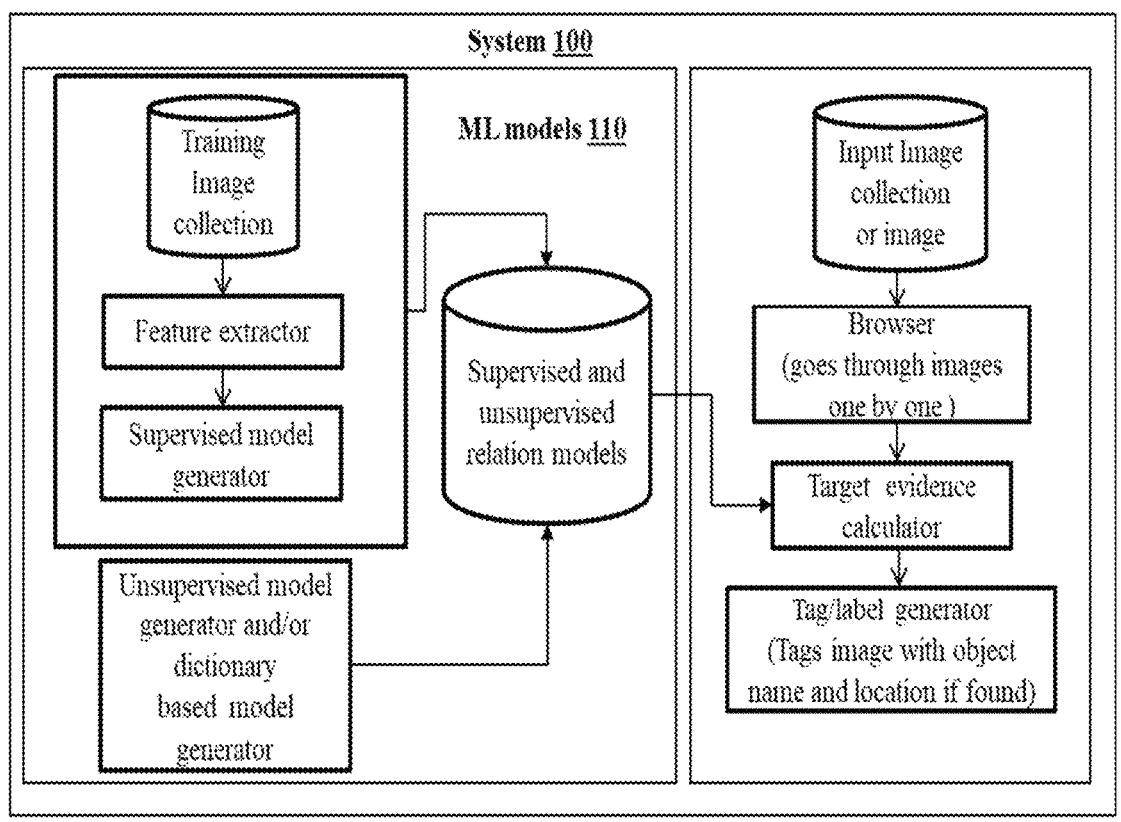
FIG. 1B illustrates an architectural overview of the system of FIG. 1, in accordance with some embodiments of the present disclosure.

Further, the memory 102 includes modules such as ML models 110, trained to detect presence of target with an evidence score indicating the magnitude of presence of the target, in the image being analyzed. The images, wherein target is detected are then labelled or tagged as images of interest. The ML models 110 are explained in conjunction with FIG. 1B, wherein FIG. 1B illustrates an architectural overview of the system of FIG. 1, in accordance with some embodiments of the present disclosure. Large volume of images belonging to a remotely sensed data are stored in the database 108 and are selected one by one selected by a browser to analyze and tag or label the images based on evidence of target detected in the respective image.

The ML models 110 are trained to analyze a received image to identify and/or localize the target in the image, and simultaneously assign the evidence for the image. The training process pipeline includes a feature extractor to extract the features of the image, wherein, target is defined by the spectral, the spatial or the combinational features. Further a supervised model generator along with a unsupervised model generator and/or dictionary based model generator are built using the training dataset to generate the trained ML models comprising a set of supervised and unsupervised relational models. The ML models 110 in conjunction with a target evidence calculator executed by the one or more hardware processors compute the evidence score for the image. The evidence score is indicative of magnitude of presence of the target in the image. The database 108 stores a training dataset or a training image collection for training the ML model 110.

Figure 2A:
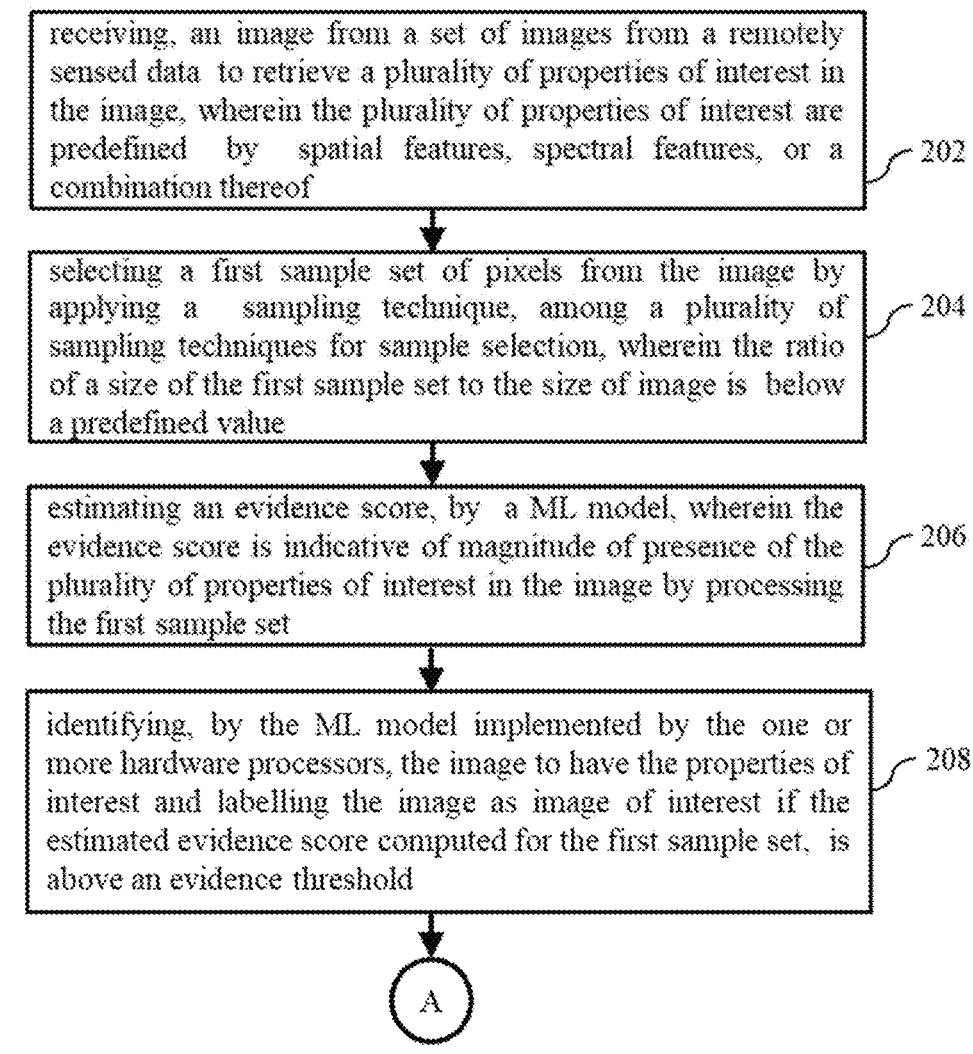
FIGS. 2A through 2B (collectively referred as FIG. 2) is a flow diagram illustrating a method for efficient retrieval of the target from the image in the collection of remotely sensed data, using the system of FIG. 1, in accordance with some embodiments of the present disclosure.
Figure 2B:
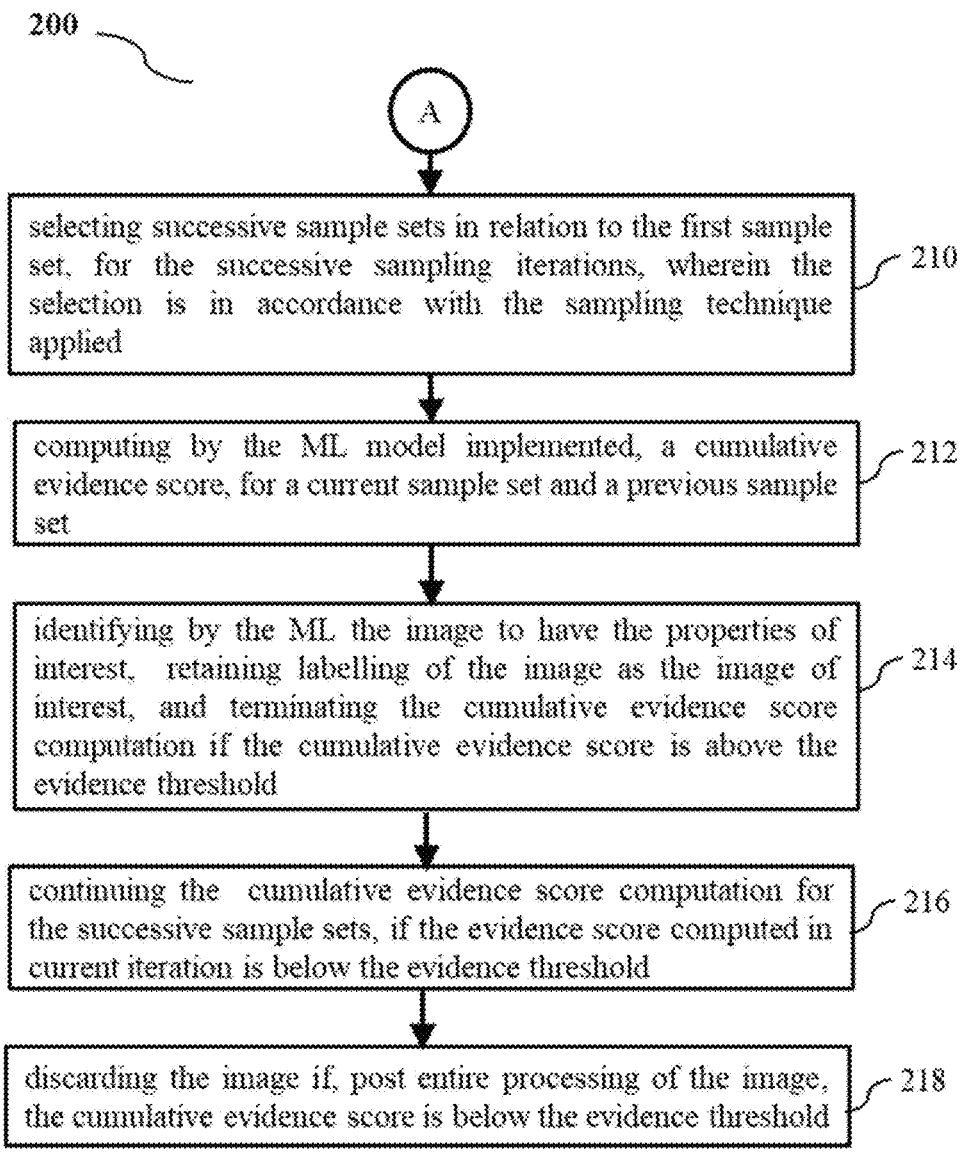

FIG. 2A and FIG. 2B (collectively referred as FIG. 2) is a flow diagram illustrating a method 200 for efficient retrieval of the target from the image in the collection of remotely sensed data, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 receive an image from a set of images from the collection of remotely sensed data to retrieve the target in the image. The target is defined by spatial features, spectral features, or a combination thereof. The spatial and spectral features or a combination thereof are specific of the type on image data to be analyzed. For example, high resolution image such as submeter would have dominant spatial features for the target, whereas hyperspectral imagery with 30 meter or more coarser resolution would exhibit spectral features predominantly.

At step 204 of the method 200, the one or more hardware processors 104 select a first sample set of pixels from the image by applying a sampling technique for sample selection. The number of pixels in the first sample set of pixels (interchangeably referred as the first sample), or any successive sample set that is selected, is a small percentage of the image size, to ensure only minimal required image is scanned to extract maximum information related to the possible properties associated with the target present in the image. Thus, ratio of a size of the first sample set or any successive to the size of image is selected to be below a predefined value. For example, in the ration can be determined by domain experts in accordance to estimated size of the target that is searched for. An illustrative example explained in conjunction with FIG. 5 (5A and 5B) indicates the sample size selection criteria and the scanning efficiency obtained by the method.

An appropriate sampling technique that provides most efficient scanning for target detection and/or localization is identified. The sampling technique identification can be either automated or indicated and set by a domain expert, in accordance with image data to be analyzed. The method disclosed herein provides the types of sampling techniques, a) an active sampling technique that enables simultaneous detecting and localizing of the target in the image, b) an evenly distributed sampling technique that only enables detecting the target in the image, and c) a hybrid sampling technique that alternatively applies the even distributed sampling technique and the active sampling technique, which enables simultaneous detecting and localizing of the target in the image.

a) Active sampling technique: Selects the first sample set of pixels based on location criteria, and successive sample sets in vicinity of a sample set identified for a previous iteration. The location criteria comprises one of i) selecting pixels within a predefined radius around a pixel at center of the image, and ii) selecting the pixels within the predefined radius at a region in the image wherein pixels features of the region have highest reciprocal difference with respect to the pixel features associated with the target. The radius, which defines size of the sample set (first sample set and successive sample sets), is selected to be as small as possible, to ensure that the system 100 scans only a portion of the entire image. The radius is determined based on scale and resolution of the set of images to be processed, in context to a pixel size identified for the target. The size of the first sample is selected to be as small as possible, to ensure that the system 100 does not end up in scanning entire image, which deviates from the purpose to provide efficient image scanning. The center of the image is selected as most appropriate location criteria for use cases where it is prior known that maximum probability of target identification is in region around the center of image.

If the first location (the first sample set) itself generates strong evidence, with an evidence score above or equal to a predefined threshold indicating presence of the target, then the system 100 stops scanning the current process (or alternatively referred as sampling process and may be interchangeably used herein) and labels or tags the image as image of interest. The evidence score threshold value can be defined by and expert. However, if the first random location does not create enough evidence, then another location in the vicinity is sampled to identify the successive sample set (a second sample set) and gathers combined evidence (from the first and the second location). If the gathered cumulative evidence score meets the evidence threshold, then the sampling process of the pixels is stopped, and the image is selected and labelled as image of interest. Else, the sampling process is continued for a predefined number of samples (which could be based on the number of pixels in the image etc.) and gathered cumulative evidence score is accumulated. The presence or absence of the target is indicated based on the accumulated evidence score and the image is selected or rejected/discarded based on the evidence score. The successive second sample sets are chosen in each iteration in such a manner that it improves the chances of locating or localizing the target (if present). Thus, the first sample set generates the child samples. The system 100 then calculates the gradient of evidence or cumulative entropy of the information. The direction is chosen that provides the increasing evidence. This is in some sense is an inverse of compressive sensing wherein the goal is to choose the pixels such that they represent the entire image with minimum information loss. The process is reversed and is driven by presence or absence of the target.

In another embodiment, wherein second location criteria is used, the approach is motivated by saccades of human vision. Human vision generates fixation at certain locations in the image which are indicative of high difference with the primitive features with respect to global (covering entire region than the focus area) primitive features. Instead of motivating this saccades or sampling locations based on the criteria mentioned, they can be triggered by reciprocal difference (similarity) with target. The gradient of difference of sampled locations and target is used for searching the image pixel space efficiently. Thus, sequence of steps followed for active sampling includes:

1) Identifying a first pixel location in the center of the image and identifying pixels within the predefined radius of the first pixel location as the first sample set. The radius is determined based on scale and resolution of the set of images to be processed, in context to a pixel size identified for the target.
2) Computing the evidence score for the first sample set and labelling the image as the image of interest if the evidence score is above or equal to the predefined evidence threshold.
3) Creating a plurality of child sample sets in the vicinity of first sample set, if the evidence score is below the evidence threshold.
4) Selecting a second sample set from among the plurality of child sets in a direction where gradient of evidence for the target is maximum.
5) Computing the cumulative evidence score for the first sample set and the second sample set and labelling the image as the image of interest with first sample set and second sample set as location of the target.
6) Iteratively performing successive second sample set selection and cumulative evidence score computation if evidence score in the previous iteration is below the evidence threshold until the entire image is scanned.

b) Evenly distributed sampling technique: Selects the first sample set of pixels comprising evenly distributed pixels across the image, and the successive sample sets by varying frequency of the evenly distributed pixels to gradually reduce spatial distance between the evenly distributed pixels. This provides simple sampling approach. Wherein the pixels or cluster of pixels are sampled at even row column distances. The evidence score for the target is calculated at one go, for one such evenly distributed sample set. The number of samples or sampling locations are determined by a configurable parameter, for example, 2 steps in each direction or 10 steps in each direction. If the first sampling is not successful, system 100 may generate another set of evenly distributed samples which may be more closely spaced. For example, if 100 step size for row and column is not enough, then system 100 samples the pixels at every 50th step in addition to 100. The system 100 would stop the iterative process of sample set selection (successive sample sets) at a predefined number of sample sets.

c) Hybrid sampling technique: This technique utilizes combination of even distributed sampling technique and the active sampling technique. The hybrid sampling technique enables simultaneous detecting and localizing of the target in the image. The steps for the hybrid sampling approach are listed below and explained in conjunction with illustrative image example if FIGS. 5A and 5B. The steps include:

1) Segmenting the image into a first set of plurality of quadrants;
2) Applying even sampling technique to identify a plurality of first samples around each of a plurality of pixels locations placed at equal pixels intervals in each of the first set of plurality of quadrants.
3) Computing the evidence score for each of the first samples for each of the first set of plurality of quadrants.
4) Selecting a first quadrant among the set of plurality of quadrants, wherein the selected first quadrant has highest cumulative evidence score calculated by aggregating the evidence scores of each of the plurality of first samples lying in the first quadrant.
5) Segmenting the first quadrant into a second set of plurality of quadrants.
6) Iteratively performing the steps of hybrid sampling technique on the second set of plurality of quadrants till the target is detected and localized.

For example, the image can be divided 4 quadrant NE, SE, SW, NW. Then system 100 begins in creating a few equidistant sampling locations in each quadrant, say 4 locations in each and group of 9 pixels at each location are sampled (chosen for analysis). The evidence score for presence or absence of the target is calculated. Based on the evidence, the quadrant with maximum evidence is chosen. The quadrant is further broken into 4 quadrants and same procedure is repeated till the target is located. As second alternative in hybrid approach, one the first sample is located, and follows a procedure as explained in the "active approach". In another embodiment, first few sample are actively chosen and then next each location is broken down in to 4 quadrants.

Steps 206 to 214 of method 200, described below, refer to processing of the first sample to decide on evidence on presence of the target, selecting successive sample sets to label the image for target presence or discard the image. Thus, at step 206, the ML model 110 executed by the one or more hardware processors 104, estimates the evidence score indicative of magnitude of presence of the target in the image by processing the first sample set of pixels. At step 208, the trained ML model 110 identifies the image to have the target and label the image as image of interest if the estimated evidence score computed for the first sample set, is above the evidence threshold. The ML model is trained for labelling the images based on evidence score computation using training data comprising a set of sampled images selected in accordance with the sampling technique used by the ML model.

Evidence score computation: The evidence score is computed by determining an association, interchangeably referred to as relation, between the presence of the target and pixels in the image, wherein association is identified using are: a) Spatial distribution of the target across the image, b) associating between the target and other properties present in the image, and c) associating relation between features of a part of image with the entire image. The evidence of presence of the target in the given image is generated by the ML model 110, using supervised or unsupervised approaches. The intuition to learn the association of the target and the image features/properties in supervised or unsupervised manner. For example, if the dictionary learned using training data matches with the dictionary learned by sampled pixels, then the target exists. In another simple embodiment (evidence score), system uses training to learn the association of certain spectral and spatial features and the presence and absence of the target. The evidence score can be based on the learned properties such as the spatial association, adjacency properties, overall spatial distribution of the pixels. For example, vegetation pixels in a certain setup would repeat in one of the three direction (horizontal, vertical, diagonal) n number of times followed by soil of built-up class (based on the dominant land use of the search region). Here it may be noted that direction word is used in deciding the next location of sample rather than location of the target.

Multiple embodiments by the method disclosed that capture the relation or association between the target (object) presence and the pixels in the image are described below:

a) Association between Spatial distribution/or bag of words primitives and target—For example, having a given edge density may signify presence of certain objects, having certain shapes or convex shapes may signify presence of certain objects. For example, at a given scale (resolution) more edge density of vertical, edges and horizontal edges would signify manmade object, whereas if the edges are irregular arcs then would signify presence of natural object. Similarly, co-occurrence matrix of edges is another indicator for a class of objects or regions. The association can be defined or learnt in multiple possible ways available.

b) Association of targets and other objects—For example, water and vegetation, building airport and runway, land. These associations among the objects/or land covers follow geographical/spatial association of objects/land covers. For example, if a road is present in an image presence of car/vehicles (target) is high. Another association is between vegetation and water bodies, indication that where a vegetation is detected presence of a water body (target) in the vicinity of the vegetation is high. vegetation. In another example, green rectangular patch near water body would be a farmland or say if there is water body at x location, then there exists a vegetation at say 3×distance away, and so on.

c) Cover and land use, land cover and target—In this case the certain land covers signify a particular target—for example, a group of soil, vegetation, trees, and green grass in certain proportions or with certain spatial configuration would be a golf course.

d) Whole and part relation—cars—parking lot, roof—This embodiment exploits part and whole relations of objects or targets. For example, if there is an evidence of two or more cars in a group, however no road segment is identified running across the detected cars, then it evidence of presence of target (parking lot) is high. In another example, if there are multiple streams present in the image at a particular location and all of them join each other at an angle less than say 90 degrees, and there is presence of soil in between the streams then, this indicates that evidence of the presence of target (a river delta) is high.

e) Neighborhood relations—Markov chains/process (any spatial LDA process to describe the generative model). In this embodiment, geographical association is modelled using Markov model. It will determine of model the label of a pixel given its previous n of pixels, where n could be any number not greater than the remaining pixels in the image on the left right or above below.

The evidence library is created using machine learning (or dictionary learning approaches) as mentioned above. When the associations are well known and deterministic, then in an embodiment associations can be specified by multiple means such as rules, cases, patterns, dictionaries etc. and can be used. The features and an association score between the target and the pixels in the image are built using training data. The association learning (association of target presence and certain feature within the images) is performed for all the features mentioned above. The association knowledge is in the form of target—primitive features association; target—shape features association; target—object association (if roads are present car also may be present). target—object distribution (visual topics), primitive feature distribution, shape distribution etc. (in this case the hypothesis is the distribution of visual topics/or distribution over visual feature for a topic would be similar for the images having similar target). These features are used as bag of words or along with their spatial order learned from the data. The knowledgebase approach may encode all these based on the expert's input. The system 100 can have mechanism to update the knowledge based on the experience. The nature of evidence score could be real number between 0 to 1 or probability/belief values. The system 100 provides the evidence score, also referred to as probabilistic score, for each image utility. The probabilistic score can be looked by expert and then he can make the judgment. Though the last option requires input from experts, the overall time saving is achieved in the process since requirement of complete/entire image scanning, as used by methods in the literature, is eliminated.

At step 210 the one or more hardware processors 104 selects successive sample sets in the successive sampling iterations in relation to the first sample set in accordance with the sampling technique. At step 212 the ML model 110 executed by the one or more hardware processors 104, computes the cumulative evidence score for a current sample set and a previous sample set. Thereafter, at step 214 the one or more hardware processors 104 identify the image to have the target, retaining labelling of the image as the image of interest, and terminating the cumulative evidence score computation if the cumulative evidence score is above the evidence threshold. However, at step 216 the one or more hardware processors 104 continue the cumulative evidence score computation for the successive sample sets, if the evidence score computed in current iteration is below the evidence threshold. At step 218 the one or more hardware processors 104 discard the image if, post entire processing of the image, the cumulative evidence score is below the evidence threshold. It can be noted that the system 100 identifies the successive samples based on the gradient of successive score such that in most scenarios the target is identified in first few iterations and entire image scanning may be executed in scenarios where target is absent, but the entire image scanning is performed to confirm the absence. However, in an embodiment, image may be discarded post scanning a predefined number of successive samples rather than the entire image scanning. This can be implemented in accordance with the knowledge about to possibility of scale of presence of target in an image.

Thus, the method and system disclosed herein provides a computation efficient, resource efficient and time efficient approach for efficient retrieval of the target in the image from the collection of remotely sensed data. An illustrative example indicating efficiency calculation is explained in conjunction with FIG. 5.

Figure 3A:
FIGS. 3A through 3C (collectively referred as FIG. 3) are example illustrations for comparative analysis of sampled images obtained for each of a plurality of sampling techniques used by the system of FIG. 1 for efficient retrieval of the target in the image from the collection of remotely sensed data, in accordance with some embodiments of the present disclosure.
Figure 3B:
Figure 3C:

FIGS. 3A through 3C (collectively referred as FIG. 3) are example illustrations for comparative analysis of sampled images obtained for each of a plurality of sampling techniques used by the system of FIG. 1 for efficient retrieval of the target in the image from the collection of remotely sensed data, in accordance with some embodiments of the present disclosure. The images depicted in FIG. 3 are from a large-scale dataset, termed "NWPU-RESISC45", which is a publicly available benchmark for Remote Sensing Image Scene Classification (RESISC), created by Northwestern Polytechnical University (NWPU).

With reference to the images in depicted in FIGS. 3A through 3C (FIG. 3), the problem is to select the images from a collection of images (remotely sensed data) that are having planes. The planes herein refer to the target defined by the plurality of properties of interest such as spectral, spatial or a combination thereof that enable identifying a plane distinctly from the background of the image. The method utilizes a supervised approach, which takes the evenly distributed samples from the images (say every alternative pixel) and identifies presence or absence of planes. It can be noted that the circular dotted lines indicating the target in the sampled images are provided for quick reference to understand the target location in image and are not system generated.

As a first step the ML models 110 is trained on the collection of images using deep learning. As mentioned, only alternative pixels are chosen to build the ML models 100. The ML models 110 can be one among existing deep learning available in the literature. During the retrieval mode or run time, the system 100 receives the image as input and reads the alternative pixels from the image (when approach used is even sampling approach). From the sampled image, which provides a reduced input data size, the ML models 110 extracts deep features and identifies if or not the sampled image has the defined target (plane).

Table. 1 shows some of the strategies for evenly distributed sampling and their score for the object presence. Table 2 shows some additional sample images which had planes and are identified by the system by using half of the pixels. Evidence score indicates the chances of plane/s being present, while accuracy is number of images (in percentages) correctly identified from a collection of images with planes form the remotely sensed data.

TABLE 1

| Image (as sampled) | FIG. 3A | FIG. 3B | FIG. 3C |
|---|---|---|---|
| Sampling technique | All the pixels (entire image) | Alternate pixel (Type 1 even sampling) | Maximum valued pixel out 2 × 2 window (Type 2 even sampling) |
| Evidence Score (0 to 1) and accuracy | 0.71/0.86 | 0.68/0.80 | 0.54/0.77 |
| Time saved | NA | ~25% | ~29% |

FIGS. 4A through 4H (collectively referred as FIG. 4) depict sample images from the remotely sensed data and corresponding sampled images with evidence score computed for each sampled image for presence of the target in the sample images, in accordance with some embodiments of the present disclosure. Table 2 provides evidence score computed for presence of the properties of interest (planes) in the sampled images for corresponding original images, as depicted in FIG. 4. It can be noted that the circular dotted lines indicating the target in the sampled images are provided for quick reference to understand the target location in the sampled image and are not system generated.

The images depicted in FIG. 4 are from a large-scale dataset, termed "NWPU-RESISC45", which is a publicly available benchmark for Remote Sensing Image Scene Classification (RESISC), created by Northwestern Polytechnical University (NWPU) as referred in *Remote Sensing Image Scene Classification: Benchmark and State of the Art*, Gong Cheng, Junwei Han, Xiaoqiang Lu.

TABLE 2

Figure 4A:
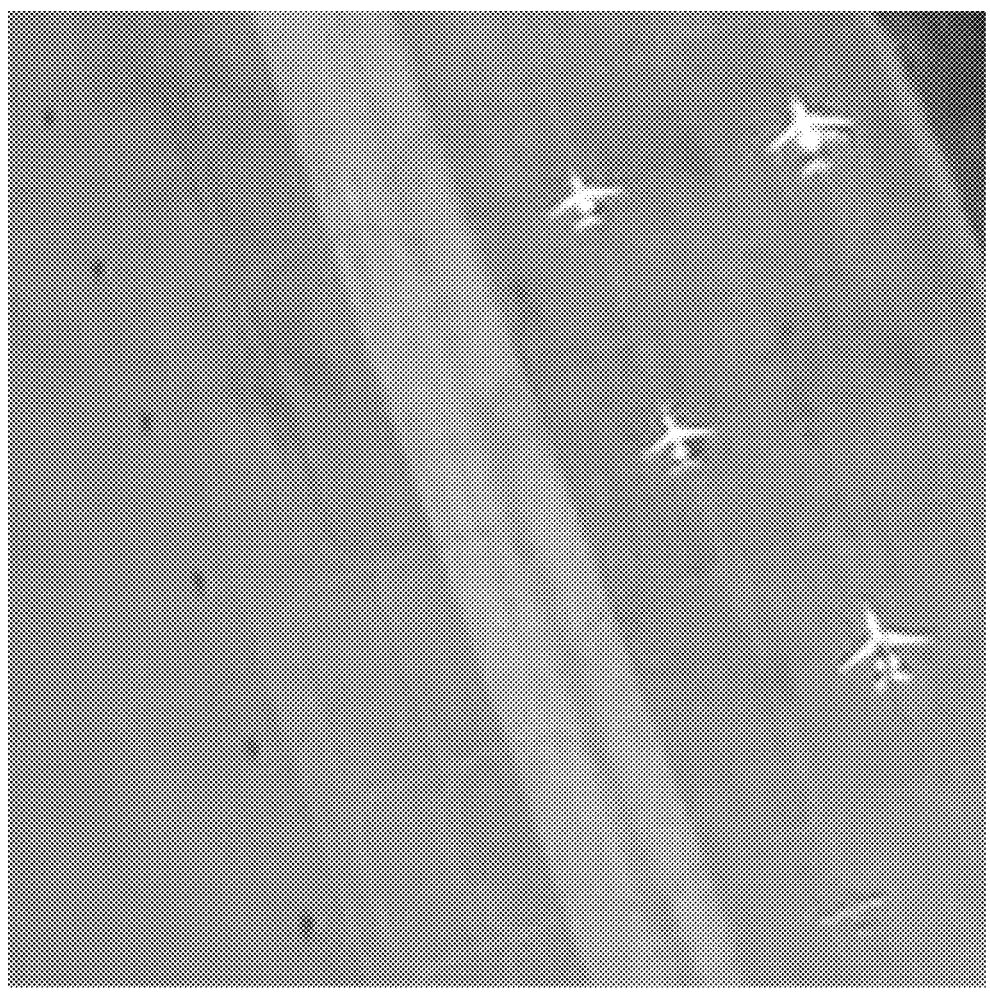
FIGS. 4A through 4H (collectively referred as FIG. 4) depict sample images from the remote sensing data and corresponding sampled images with evidence score computed for each sampled image for presence of the target from the image in the collection of remotely sensed data, in accordance with some embodiments of the present disclosure.
Figure 4B:
Figure 4B:
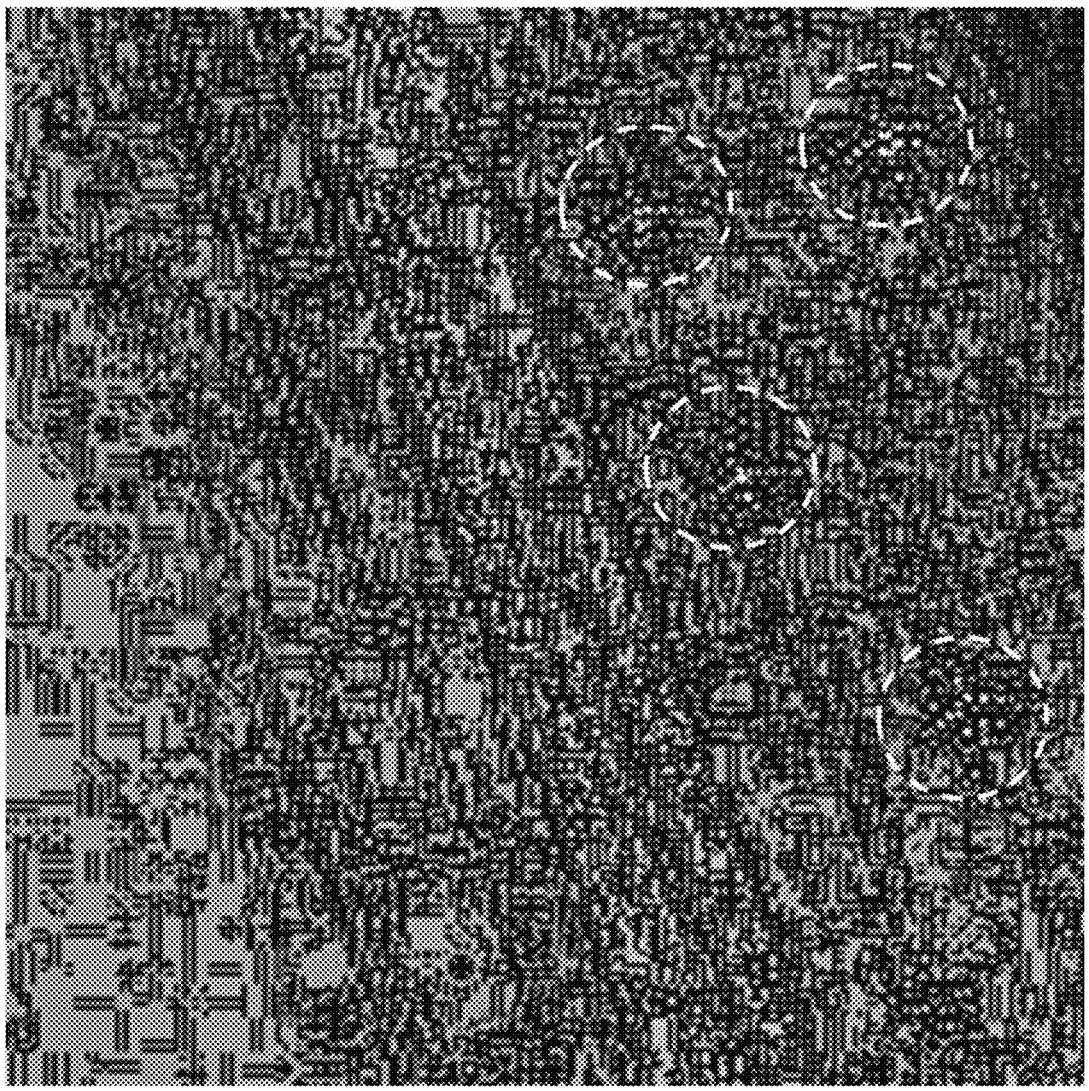
Figure 4C:
Figure 4D:
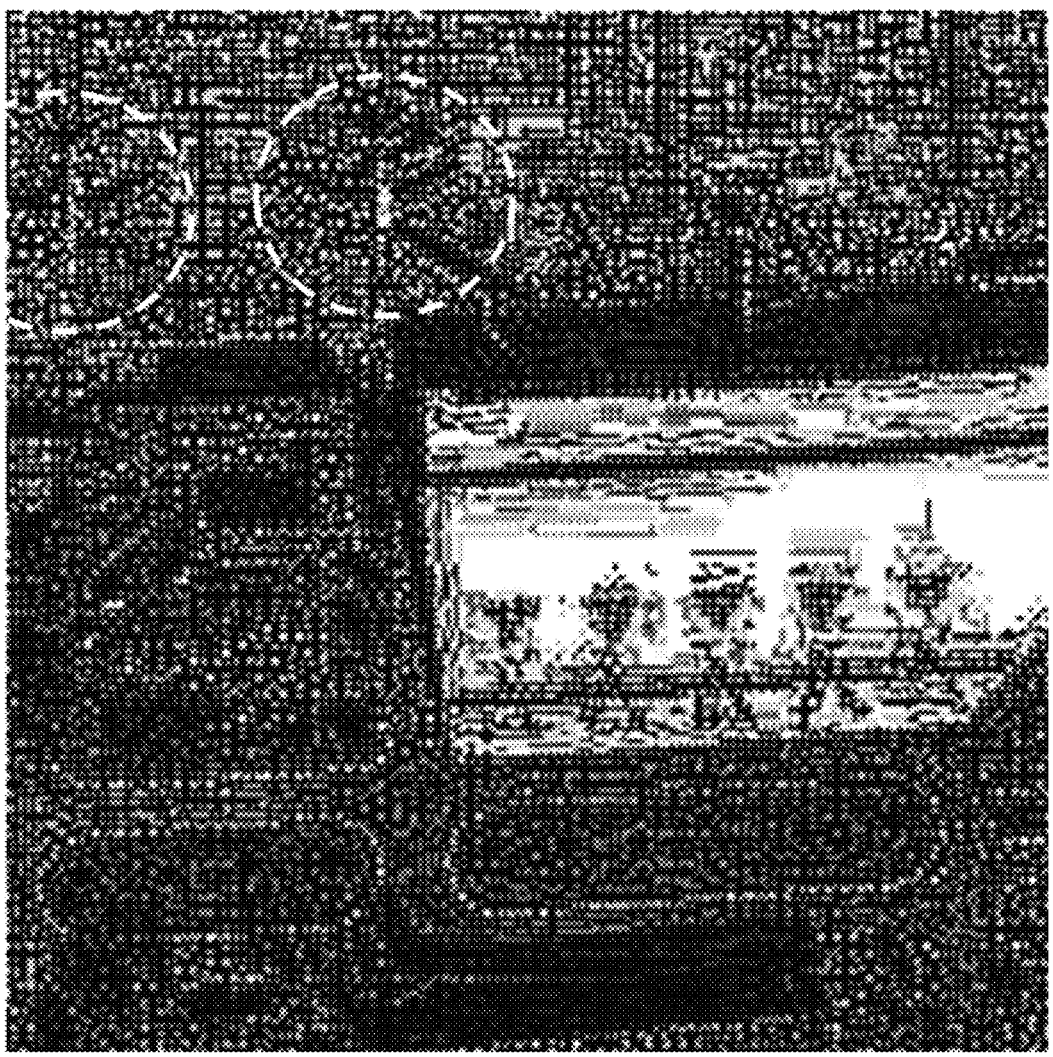
Figure 4E:
Figure 4F:
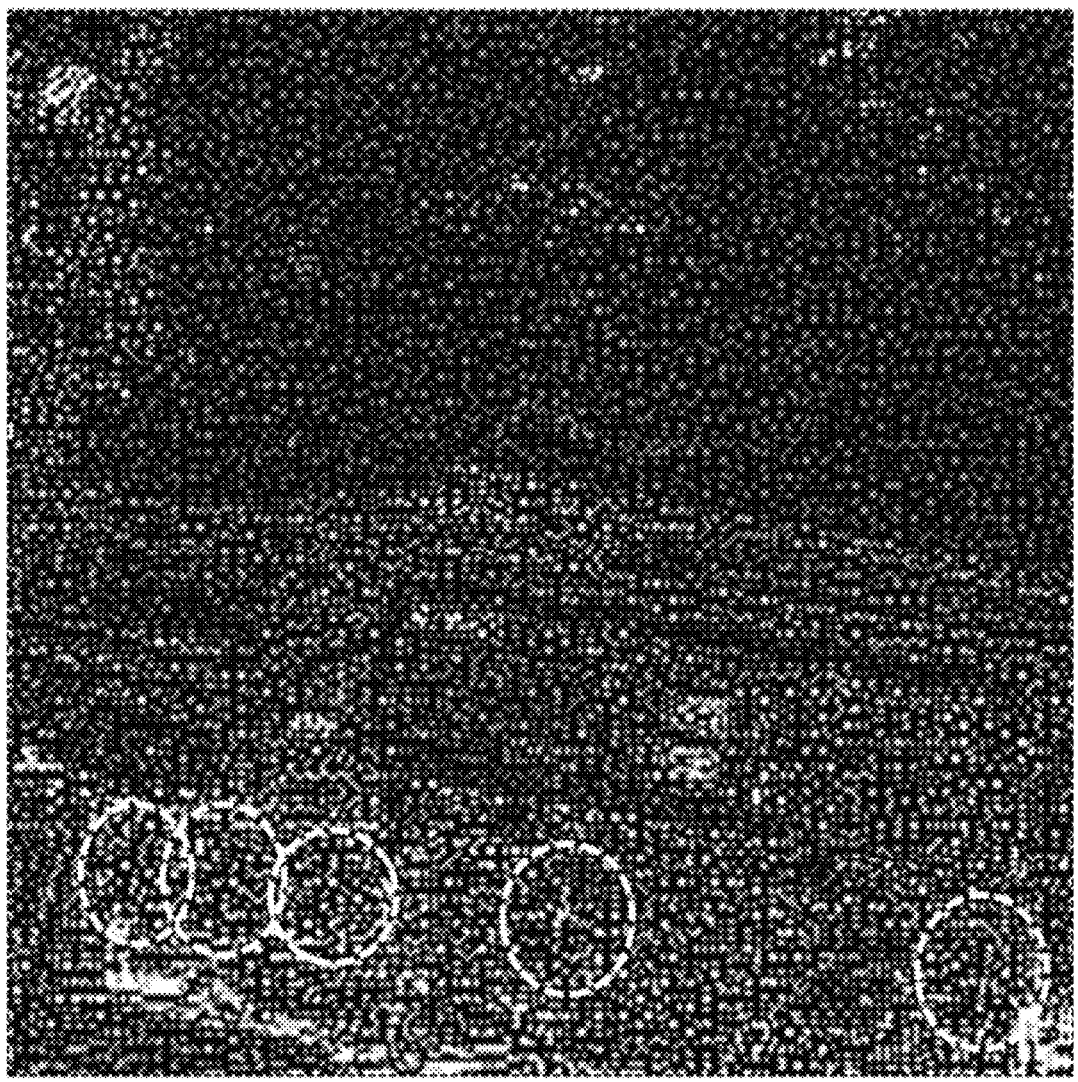
Figure 4G:
Figure 4H:

| Original Image | FIG. 4A | FIG. 4C | FIG. 4E | FIG. 4G |
|---|---|---|---|---|
| Sampled Image | FIG. 4B | FIG. 4D | FIG. 4F | FIG. 4H |
| Evidence Score (0 to 1) | 0.65 | 0.76 | 0.51 | 0.61 |

Figure 5A:
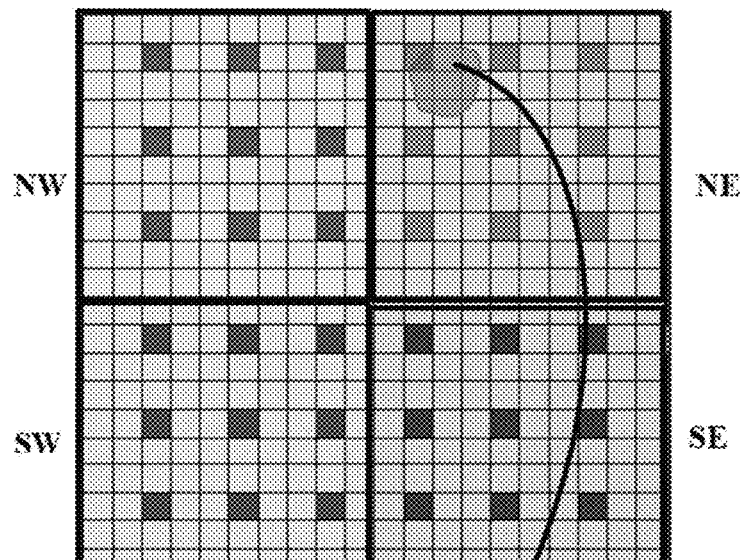
FIGS. 5A and 5B (collectively referred as FIG. 5) is an illustrative image depicting a hybrid sampling approach, in accordance with some embodiments of the present disclosure.
Figure 5B:
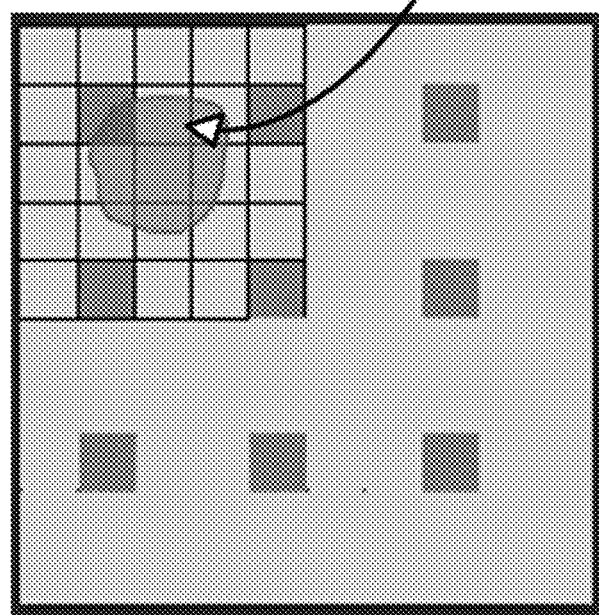

FIGS. 5A and 5B (collectively referred as FIG. 5) is an illustrative image depicting a hybrid sampling approach, in accordance with some embodiments of the present disclosure. FIG. 5A exemplifies a large image—each square is a pixel or a group of pixels of n×n pixels—say 3×3. Image is divided into 4 quadrants as shown. NE, SE), SW, and NW. In the example, the target is a water body and all images capturing the waterbody are to be selected and labelled as images of interest for further analysis. It can be assumed the features of the target (spatial, spectral or a combination thereof) are known along with the scale of the image, then the number of pixels occupied by water body (target) can be calculated.

The search procedure begins with generating the sampling locations in each quadrant. Sampling locations and pixels marked around the sampled location (that is sampled pixels) are indicated by black cell. Based on the image scale/resolution the number of pixels sampled around the sampling location are decided, wherein the sampling location refers to a single pixel identified by row and column or geographical coordinates)

Each cell represents the window of n×n pixels. In this example it is assumed that n=3. That means 9 pixels at the locations as shown in the NE quadrant are sampled and would be processed to see if object is in the NE quadrant or not. Same process is repeated in all the quadrants. As depicted in the FIG. 5A, the sampled locations and the sampled pixels around the sampled location are shown in the darker shades of color given to the cells in each quadrant. Next, the sampled pixels in each quadrant are matched with water spectral signature (zero or near zero spectral reflectance in infrared band indicates presence of water).

In the above case, test in all quadrants would be negative and only one group in NE quadrant will return positive test results. All other quadrants would be discarded and only NE quadrant would be chosen for further sampling, as depicted in FIG. 5B. In next step this quadrant would be further broken in to 4 quadrants as in first step and same process would be repeated. In the next step, the n may remain same or decrease. For example, in next step it could be 2 or even 1. N in each step would be a configurable parameter of the system. Thus, by repeated reduced search space the extent of the water body would be identified. At higher level it can identify approximate location of the water body as NE>NW>NW quadrant. This in a 20×20=400×9 (3600) pixel image, by sampling 36×9 ( ) pixels, the system 100 is able to detect and locate the target. This is $36/400$=~1% of pixels. This is simple example for illustration indicating the scanning efficiency achieved, effectively adding to time, computation and resource efficiency provided by the system.

The process of detecting and locating the target (object) with minimum number of pixel is generic and can be adopted to any deep learning architectures for object detection, Current Deep Learning (DL) architectures like the yolo™ create a fixed size window and move over an image. The object presence is calculated using pretrained models. This existing architectures sample or consider all the pixels in the window during online (real time testing) process and during the training process as well. Instead, the object detection approach followed by the method disclosed could be used in deep learning framework to detect and locate the object in any image. The approach used in FIGS. 5A and 5B can be one such technique used by current DL models.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for efficient retrieval of a target from an image in a collection of remotely sensed data, the method comprising:
   receiving, by one or more hardware processors, the image from a set of images in the collection of remotely sensed data to retrieve the target from the image, wherein the target is defined by spatial features, spectral features, or a combination thereof;
   selecting, by the one or more hardware processors, a first sample set of pixels from the image by applying a sampling technique, wherein the sampling technique comprises one of:
   a) an active sampling technique that selects the first sample set of pixels based on location criteria, and successive sample sets in vicinity of a sample set identified for a previous iteration, wherein the location criteria comprises one of i) selecting pixels within a predefined radius around a pixel at center of the image, and ii) selecting the pixels within the predefined radius at a region in the image wherein pixels features of the region have highest reciprocal difference with respect to the pixel features associated with the target, and wherein the active sampling technique enables simultaneous detecting and localizing of the plurality of desired properties in the image; and
   b) an evenly distributed sampling technique that selects i) the first sample set of pixels comprising evenly distributed pixels across the image, and ii) the successive sample sets by varying frequency of the evenly distributed pixels to gradually reduce spatial distance between the evenly distributed pixels, wherein the evenly distributed sampling technique enables detecting of the plurality of desired properties in the image;
   estimating an evidence score, by ML models implemented by the one or more hardware processors by processing the first sample set of pixels, wherein the evidence score is indicative of magnitude of presence of the target in the image;
   identifying, by the one or more hardware processors, the image to have the target and labelling the image as image of interest if the estimated evidence score computed for the first sample set of pixels, is above an evidence threshold;
   selecting, by the one or more hardware processors, successive sample sets in relation to the first sample set of pixels, for the successive sampling iterations, wherein the selection is in accordance with the sampling technique applied;
   computing, by the ML models implemented by the one or more hardware processors, a cumulative evidence score, for a current sample set of pixels and a previous sample set of pixels;
   identifying, by the one or more hardware processors, the image to have the target, retaining labelling of the image as the image of interest, and terminating the cumulative evidence score computation if the cumulative evidence score is above the evidence threshold;
   continuing, by the one or more hardware processors, the cumulative evidence score computation for the successive sample sets of pixels, if the evidence score computed in current iteration is below or equal to the evidence threshold; and
   discarding, by the one or more hardware processors, the image if post entire processing of the image, the cumulative evidence score is below the evidence threshold.

2. The processor implemented method of claim 1, wherein the active sampling technique comprises:
   identifying a first pixel location in the center of the image and identifying pixels within a predefined radius of the first pixel location as the first sample set of pixels, wherein the radius is determined based on scale and resolution of the set of images to be processed, and in context to a pixel size identified for the target;
   computing the evidence score for the first sample set and labelling the image as the image of interest if the evidence score is above or equal the predefined evidence threshold;
   creating a plurality of child sample sets of pixels in the vicinity of the first sample set of pixels, if the evidence score is below the evidence threshold;
   selecting a second sample set of pixels from among the plurality of child sets in a direction where gradient of evidence for the target is maximum;
   computing the cumulative evidence score for the first sample set of pixels and the second sample set of pixels and labelling the image as the image of interest, with first sample set and second sample identified as location of the target; and iteratively performing successive second sample set of pixel selection and the cumulative evidence score computation if the evidence score in the previous iteration is below the evidence threshold until the entire image is scanned.

3. The processor implemented method of claim 1, further comprising applying a hybrid sampling technique that utilizes combination of even distributed sampling technique and the active sampling technique, wherein the hybrid sampling technique enables simultaneous detecting and localizing of the plurality of desired properties in the image, the hybrid sampling technique comprising:
   segmenting the image into a first set of plurality of quadrants;
   applying the even sampling technique to identify a plurality of first samples of pixels around each of a plurality of pixels locations placed at equal pixels intervals in each of the first set of plurality of quadrants;
   computing the evidence score for each of the plurality of first samples of pixels for each of the first set of plurality of quadrants;
   selecting a first quadrant among the first set of plurality of quadrants, wherein the selected first quadrant has highest cumulative evidence score calculated by aggregating the evidence scores of each of the plurality of first samples of pixels lying in the first quadrant;
   segmenting the first quadrant into a second set of plurality of quadrants; and
   iteratively performing the steps of hybrid sampling technique on the second set of plurality of quadrants till the target is detected and localized.

4. The processor implemented method of claim 1, wherein the ML models are trained for labelling the images by computing evidence score using training data comprising a set of sampled images selected in accordance with the sampling technique used by the ML model.

5. The processor implemented method of claim 1, wherein the evidence score is computed by determining an association between the presence of the target and pixels in the image, wherein the association is identified using: a) Spatial distribution of the target across the image, b) associating between the target and other properties present in the image, and c) associating relation between features of a part of image with the entire image.

6. The processor implemented method of claim 1, wherein a ratio of a size of the first sample set of pixels to the size of the image is below a predefined value.

7. A system for efficient retrieval of a target from an image in a collection of remotely sensed data, the system comprising:
   a memory storing instructions;
   one or more Input/Output (I/O) interfaces; and
   one or more hardware processors coupled to the memory via the one or more I/O interfaces, wherein the one or more hardware processors are configured by the instructions to:
      receive the image from a set of images in the collection of remotely sensed data to retrieve the target from the image, wherein the target is defined by spatial features, spectral features, or a combination thereof;
      select a first sample set of pixels from the image by applying a sampling technique, wherein the sampling technique comprises one of:
      a) an active sampling technique that selects the first sample set of pixels based on location criteria, and successive sample sets in vicinity of a sample set identified for a previous iteration, wherein the location criteria comprises one of i) selecting pixels within a predefined radius around a pixel at center of the image, and ii) selecting the pixels within the predefined radius at a region in the image wherein pixels features of the region have highest reciprocal difference with respect to the pixel features associated with the target, and wherein the active sampling technique enables simultaneous detecting and localizing of the plurality of desired properties in the image; and
      b) an evenly distributed sampling technique that selects i) the first sample set of pixels comprising evenly distributed pixels across the image, and ii) the successive sample sets by varying frequency of the evenly distributed pixels to gradually reduce spatial distance between the evenly distributed pixels, wherein the evenly distributed sampling technique enables detecting of the plurality of desired properties in the image;
      estimate by ML models executed by the one or more hardware processors by processing the first sample set of pixels, wherein the evidence score is indicative of magnitude of presence of the target in the image;
      identify the image to have the target and labelling the image as image of interest if the estimated evidence score computed for the first sample set of pixels, is above an evidence threshold;
      select successive sample sets in relation to the first sample set of pixels, for the successive sampling iterations, wherein the selection is in accordance with the sampling technique applied;
      compute by the ML models executed by the one or more hardware processors, a cumulative evidence score, for a current sample set of pixels and a previous sample set of pixels;
      identify the image to have the target, retaining labelling of the image as the image of interest, and terminating the cumulative evidence score computation if the cumulative evidence score is above the evidence threshold;
      continue the cumulative evidence score computation for the successive sample sets of pixels, if the evidence score computed in current iteration is below or equal to the evidence threshold; and
      discard the image if post entire processing of the image, the cumulative evidence score is below the evidence threshold.

8. The system of claim 7, wherein the active sampling technique comprises:
   identifying a first pixel location in the center of the image and identifying pixels within a predefined radius of the first pixel location as the first sample set of pixels, wherein the radius is determined based on scale and resolution of the set of images to be processed, and in context to a pixel size identified for the target;
   computing the evidence score for the first sample set and labelling the image as the image of interest if the evidence score is above or equal the predefined evidence threshold;
   creating a plurality of child sample sets of pixels in the vicinity of the first sample set of pixels, if the evidence score is below the evidence threshold;
   selecting a second sample set of pixels from among the plurality of child sample sets in a direction where gradient of evidence for the target is maximum;
   computing the cumulative evidence score for the first sample set of pixels and the second sample set of pixels and labelling the image as the image of interest, with first sample set and second sample identified as location of the target; and iteratively performing successive second sample set of pixel selection and the cumulative evidence score computation if the evidence score in the previous iteration is below the evidence threshold until the entire image is scanned.

9. The system of claim 7, is further configured to apply a hybrid sampling technique that utilizes combination of even distributed sampling technique and the active sampling technique, wherein the hybrid sampling technique enables simultaneous detecting and localizing of the plurality of desired properties in the image, the hybrid sampling technique comprising:

segmenting the image into a first set of plurality of quadrants;

applying the even sampling technique to identify a plurality of first samples of pixels around each of a plurality of pixels locations placed at equal pixels intervals in each of the first set of plurality of quadrants;

computing the evidence score for each of the plurality of first samples of pixels for each of the first set of plurality of quadrants;

selecting a first quadrant among the first set of plurality of quadrants, wherein the selected first quadrant has highest cumulative evidence score calculated by aggregating the evidence scores of each of the plurality of first samples of pixels lying in the first quadrant;

segmenting the first quadrant into a second set of plurality of quadrants; and iteratively performing the steps of hybrid sampling technique on the second set of plurality of quadrants till the target is detected and localized.

10. The system of claim 7, wherein the ML models are trained for labelling the images by computing evidence score using training data comprising a set of sampled images selected in accordance with the sampling technique used by the ML model.

11. The system of claim 7, wherein the evidence score is computed by determining an association between the presence of the target and pixels in the image, wherein the association is identified using: a) Spatial distribution of the target across the image, b) associating between the target and other properties present in the image, and c) associating relation between features of a part of image with the entire image.

12. The system of claim 7, wherein a ratio of a size of the first sample set of pixels to the size of the image is below a predefined value.

13. One or more non-transitory machine-readable information storage mediums comprising one or more instructions, which when executed by one or more hardware processors causes a method for efficient retrieval of a target from an image in a collection of remotely sensed data, the method comprising:

receiving the image from a set of images in the collection of remotely sensed data to retrieve the target from the image, wherein the target is defined by spatial features, spectral features, or a combination thereof;

selecting a first sample set of pixels from the image by applying a sampling technique, wherein the sampling technique comprises one of:

a) an active sampling technique that selects the first sample set of pixels based on location criteria, and successive sample sets in vicinity of a sample set identified for a previous iteration, wherein the location criteria comprises one of i) selecting pixels within a predefined radius around a pixel at center of the image, and ii) selecting the pixels within the predefined radius at a region in the image wherein pixels features of the region have highest reciprocal difference with respect to the pixel features associated with the target, and wherein the active sampling technique enables simultaneous detecting and localizing of the plurality of desired properties in the image; and b) an evenly distributed sampling technique that selects i) the first sample set of pixels comprising evenly distributed pixels across the image, and ii) the successive sample sets by varying frequency of the evenly distributed pixels to gradually reduce spatial distance between the evenly distributed pixels, wherein the evenly distributed sampling technique enables detecting of the plurality of desired properties in the image;

estimating an evidence score, by ML models, by processing the first sample set of pixels, wherein the evidence score is indicative of magnitude of presence of the target in the image;

identifying the image to have the target and labelling the image as image of interest if the estimated evidence score computed for the first sample set of pixels, is above an evidence threshold;

selecting successive sample sets in relation to the first sample set of pixels, for the successive sampling iterations, wherein the selection is in accordance with the sampling technique applied;

computing by the ML models, a cumulative evidence score, for a current sample set of pixels and a previous sample set of pixels;

identifying the image to have the target, retaining labelling of the image as the image of interest, and terminating the cumulative evidence score computation if the cumulative evidence score is above the evidence threshold;

continuing the cumulative evidence score computation for the successive sample sets of pixels, if the evidence score computed in current iteration is below or equal to the evidence threshold; and discarding the image if post entire processing of the image, the cumulative evidence score is below the evidence threshold.

14. The one or more non-transitory machine-readable information storage mediums of claim 13, wherein the active sampling technique comprises:

identifying a first pixel location in the center of the image and identifying pixels within a predefined radius of the first pixel location as the first sample set of pixels, wherein the radius is determined based on scale and resolution of the set of images to be processed, and in context to a pixel size identified for the target;

computing the evidence score for the first sample set and labelling the image as the image of interest if the evidence score is above or equal the predefined evidence threshold;

creating a plurality of child sample sets of pixels in the vicinity of the first sample set of pixels, if the evidence score is below the evidence threshold;

selecting a second sample set of pixels from among the plurality of child sample sets in a direction where gradient of evidence for the target is maximum;

computing the cumulative evidence score for the first sample set of pixels and the second sample set of pixels and labelling the image as the image of interest, with first sample set and second sample identified as location of the target; and iteratively performing successive second sample set of pixel selection and the cumulative evidence score computation if the evidence score in the previous iteration is below the evidence threshold until the entire image is scanned.

15. The one or more non-transitory machine-readable information storage mediums of claim 13, further comprising applying a hybrid sampling technique that utilizes combination of even distributed sampling technique and the active sampling technique, wherein the hybrid sampling technique enables simultaneous detecting and localizing of the plurality of desired properties in the image, the hybrid sampling technique comprising:

segmenting the image into a first set of plurality of quadrants;

applying the even sampling technique to identify a plurality of first samples of pixels around each of a plurality of pixels locations placed at equal pixels intervals in each of the first set of plurality of quadrants;

computing the evidence score for each of the plurality of first samples of pixels for each of the first set of plurality of quadrants;

selecting a first quadrant among the first set of plurality of quadrants, wherein the selected first quadrant has highest cumulative evidence score calculated by aggregating the evidence scores of each of the plurality of first samples of pixels lying in the first quadrant;

segmenting the first quadrant into a second set of plurality of quadrants; and iteratively performing the steps of hybrid sampling technique on the second set of plurality of quadrants till the target is detected and localized.

16. The one or more non-transitory machine-readable information storage mediums of claim 13, wherein the ML models are trained for labelling the images by computing evidence score using training data comprising a set of sampled images selected in accordance with the sampling technique used by the ML model.

17. The one or more non-transitory machine-readable information storage mediums of claim 13, wherein the evidence score is computed by determining an association between the presence of the target and pixels in the image, wherein the association is identified using: a) Spatial distribution of the target across the image, b) associating between the target and other properties present in the image, and c) associating relation between features of a part of image with the entire image.

18. The one or more non-transitory machine-readable information storage mediums of claim 13, wherein a ratio of a size of the first sample set of pixels to the size of the image is below a predefined value.

* * * * *